United States Patent
Ogino et al.

(10) Patent No.: US 6,743,502 B2
(45) Date of Patent: Jun. 1, 2004

(54) ELECTROPHOTOGRAPHIC TRANSFER SHEET AND PROCESS FOR FORMING COLOR IMAGE USING THE SAME

(75) Inventors: Takashi Ogino, Ebina (JP); Kiyoshi Hosoi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/949,670

(22) Filed: Sep. 12, 2001

(65) Prior Publication Data

US 2002/0037176 A1 Mar. 28, 2002

(30) Foreign Application Priority Data

Sep. 20, 2000 (JP) .......................................... 2000-285751

(51) Int. Cl.⁷ .......................... B32B 27/36; B32B 27/10; G03G 13/01
(52) U.S. Cl. ........................ 428/332; 428/480; 428/481; 430/47
(58) Field of Search ................................. 428/332, 480, 428/481; 430/47

(56) References Cited

U.S. PATENT DOCUMENTS 5,624,747 A * 4/1997 Sarkar et al. ............... 428/327
5,663,021 A * 9/1997 Hosoi et al. ................. 430/47
5,733,694 A * 3/1998 Takahena et al. ............ 430/47
2001/0036545 A1 * 11/2001 Nishi et al. .............. 428/315.7

FOREIGN PATENT DOCUMENTS

| JP | A 5-216322 | 8/1993 |
| JP | A 6-19178 | 1/1994 |
| JP | A 11-231562 | 8/1999 |

* cited by examiner

*Primary Examiner*—Holly Rickman
(74) *Attorney, Agent, or Firm*—Oliff & Berridge, PLC

(57) ABSTRACT

An electrophotographic transfer sheet and a process for forming a color image using the same are provided, by which formation of relief of a toner image on the surface of the electrophotographic transfer sheet can be prevented, sufficient high gloss and gloss uniformity can be obtained, and formation of cracks on the surface of the electrophotographic transfer sheet can be prevented. In an electrophotographic transfer sheet containing a substrate having one surface thereof an image receiving layer containing a thermoplastic resin as a main component, a resin constituting the image receiving layer has a melt viscosity at 120° C. of about from 200 to 2,000 Pa·s and an elongation after fracture of about 50% or more, whereby the problem is solved.

8 Claims, 11 Drawing Sheets

EXAMPLES AND COMPARATIVE EXAMPLES

| | ELONGATION(%) | THICKNESS OF IMAGE RECEIVING LAYER(μm) | MELT VISCOSITY(Pa·s) | RESIN MIXING RATIO | |
|---|---|---|---|---|---|
| | | | | BURYING | CRACK |
| EXAMPLE① | 150 | 12 | 1000 | ○ | 10mm |
| EXAMPLE② | 50 | 7 | 400 | △ | 20mm |
| EXAMPLE③ | 50 | 20 | 2000 | ○ | 30mm |
| EXAMPLE④ | 50 | 12 | 200 | ○ | 30mm |
| COMPARATIVE EXAMPLE① | 5 | 12 | 1000 | ○ | 100mm |
| COMPARATIVE EXAMPLE② | 150 | 5 | 1000 | × | 10mm |
| COMPARATIVE EXAMPLE③ | 150 | 25 | 1000 | ○ | 50mm |
| COMPARATIVE EXAMPLE④ | 50 | 12 | 3000 | × | 20mm |

| ○ | NO RELIEF ON IMAGE WITH UNIFORM GLOSS |
| △ | SOMEWHAT CONSPICUOUS RELIEF ON IMAGE WITH RELATIVELY UNIFORM GLOSS |
| × | CONSPICUOUS RELIEF ON IMAGE WITH GLOSS NONUNIFORMITY |

FIG.8

EXAMPLES AND COMPARATIVE EXAMPLES

| | ELONGATION(%) | THICKNESS OF IMAGE RECEIVING LAYER(μm) | MELT VISCOSITY(Pa·s) | RESIN MIXING RATIO BURYING | CRACK |
|---|---|---|---|---|---|
| EXAMPLE① | 150 | 12 | 1000 | ○ | 10mm |
| EXAMPLE② | 50 | 7 | 400 | △ | 20mm |
| EXAMPLE③ | 50 | 20 | 2000 | ○ | 30mm |
| EXAMPLE④ | 50 | 12 | 200 | ○ | 30mm |
| COMPARATIVE EXAMPLE① | 5 | 12 | 1000 | ○ | 100mm |
| COMPARATIVE EXAMPLE② | 150 | 5 | 1000 | × | 10mm |
| COMPARATIVE EXAMPLE③ | 150 | 25 | 1000 | ○ | 50mm |
| COMPARATIVE EXAMPLE④ | 50 | 12 | 3000 | × | 20mm |

| ○ | NO RELIEF ON IMAGE WITH UNIFORM GLOSS |
|---|---|
| △ | SOMEWHAT CONSPICUOUS RELIEF ON IMAGE WITH RELATIVELY UNIFORM GLOSS |
| × | CONSPICUOUS RELIEF ON IMAGE WITH GLOSS NONUNIFORMITY |

RELATIONSHIP BETWEEN CRACK FORMING DIAMETER AND THICKNESS OF IMAGE RECEIVING LAYER

| | | |
|---|---|---|
| A : FULL LENGTH | | 175 |
| B : WIDTH OF BOTH ENDS | | 20 ± 0.5 |
| C : LENGTH OF PARALLEL PART | | 60 ± 0.5 |
| D : WIDTH OF PARALLEL PART | | 10 ± 0.5 |
| E : RADIUS OF ROUND SHOLDER (MINIMUM) | | 60 |
| F : THICKNESS | | 1 ~ 10 |
| G : DISTANCE BETWEEN MARKERS | | 50 ± 0.5 |
| H : DISTANCE BETWEEN CHUCKS | | 115 ± 5 | ks
ELECTROPHOTOGRAPHIC TRANSFER SHEET AND PROCESS FOR FORMING COLOR IMAGE USING THE SAME

FIELD OF THE INVENTION

The present invention relates to an electrophotographic transfer sheet used in an apparatus for forming a color image, such as a color duplicator, a color printer and a color facsimile machine, to which an electrophotographic process is applied, and to a process for forming a color image using the transfer sheet, and more particularly, the invention relates to an electrophotographic transfer sheet that relief on an image transferred to the electrophotographic transfer sheet are lightened, the gloss property is increased to improve the image quality, and cracks formed on bending the electrophotographic transfer sheet are suppressed, and to a process for forming a color image using the transfer sheet.

BACKGROUND OF THE INVENTION

One example of the apparatus for forming a color image, such as a color duplicator and a color printer, to which an electrophotographic process is applied, has only one photoreceptor drum, is equipped and is constituted in such a manner that toner images of respective colors, yellow (Y), magenta (M), cyan (C) and black (BK), are consecutively formed on the photoreceptor drum, and after transferring and accumulating the toner images of respective colors, yellow (Y), magenta (M), cyan (C) and black (BK), consecutively formed on the photoreceptor drum on a transfer sheet, the toner images are heated to be fixed on the transfer sheet, so as to form a color image. Another example thereof is constituted in such a manner that the toner images of respective colors, yellow (Y), magenta (M), cyan (C) and black (BK), consecutively formed on the photoreceptor drum are once primarily transferred and accumulated on an intermediate transfer material, and the toner images of the respective colors are then secondarily transferred to a transfer sheet all at once, followed by heating the toner images to be fixed on the transfer sheet, so as to form a color image.

A further example thereof has plural image forming units corresponding to respective colors, yellow (Y), magenta (M), cyan (C) and black (BK), and is constituted in such a manner that toner images of respective colors, yellow (Y), magenta H), cyan (C) and black (BK), consecutively formed on photoreceptor drums of the image forming units are transferred and accumulated on a transfer sheet, or in alternative, they are once primarily transferred and accumulated on an intermediate transfer material, and the toner images are then secondarily transferred to a transfer sheet all at once, followed by heating the toner images to be fixed on the transfer sheet, so as to form a color image.

The color toner transferred and fixed on the transfer sheet is generally constituted by dispersing or melting and mixing a coloring agent formed from a pigment or a dye in a binder resin or by polymerizing a monomer with a dye and wax in an aqueous system, and the particle diameter thereof is generally set at from several micrometers to several tens micrometers. The color toner is transferred to ordinary paper or coated paper, in such a state that plural toner layers are accumulated, and the color toner is fixed by heating and melting on ordinary paper or coated paper, whereby a color image is formed. At this time, unevenness of, for example, about from 10 to 100 $\mu$m is formed on the surface of the color image due to ups and downs of the toner layers to form gloss nonuniformity. As a result, the color image formed on ordinary paper or coated paper, irregularly reflects incident illumination light and appears as an image with poor gloss uniformity upon observing by the naked eye.

JP-A-5-216322 discloses a process, in which a transparent resin layer is set up on the surface of the transfer sheet, and a color toner is fixed on the transparent resin layer to form a color image, by which a color image excellent in gloss with rich color tones, excellent color reproducibility and high resolution can be obtained.

However, in the technique disclosed in JP-A-5-216322, in which a transparent resin layer is set upon the surface of the transfer sheet, and a color toner is fixed on the transparent resin layer to form a color image, when the transfer sheet 100 is bent as shown in FIG. 10, stress is concentrated at a part of poor strength of the transparent resin layer 101 to form a crack at that part, so as to deteriorate the image quality.

JP-A-6-19178 discloses a color image transfer sheet and a process for forming a color image, by which a color image having good gloss and good preservation property with high quality and no crack can be provided by the electrophotographic process.

JP-A-11-231562 discloses a process for forming an image, by which an image excellent in gloss uniformity and color reproducibility with good graininess can be obtained, and a crack on the surface layer of a recording sheet after forming an image and blocking defect does not occur.

The color image transfer material disclosed in JP-A-6-19178 is an image transfer material for forming a color image with three or more kinds of color toners that is constituted to have a transparent resin layer formed with a styrene-acrylic series resin containing a styrene-butadiene copolymer on the surface of the image transfer sheet.

The process for forming a color image disclosed in JP-A-6-19178 is a process for forming a color image by melting a toner image formed with three or more kinds of color toners and fixing it on an image transfer sheet, in which a transparent resin layer formed with a styrene-acrylic series resin containing a styrene-butadiene copolymer is provided on the surface of the image transfer sheet, and the toner image is melted and fixed on the image transfer sheet with a transporting and heating material of a belt form.

The process for forming an image disclosed in JP-A-11-231562 is a process for forming an image containing a step of transferring and fixing a toner image that has been transported to the prescribed toner image transferring position with a toner image retainer, which retains the toner image and transfers the toner image from the prescribed toner image forming position to the toner image transferring position, on the prescribed recording sheet by heating at least one of the toner image retainer and the recording sheet. In the process, the recording sheet is constituted in such a manner that the recording sheet has a thermoplastic transparent resin layer formed from two layers, i.e., an undercoating layer and an overcoating layer, at least on the surface of a substrate, on which the toner image is to be transferred, in which the softening point (Tm2) of the undercoating layer of the transparent resin layer and the softening point (Tm1) of the toner have the relationship, Tm2<(Tm1−20)° C., and the softening point (Tm3) of the overcoating layer of the transparent resin layer and the softening point (Tm1) of the toner have the relationship, Tm1<Tm3<(Tm1+20)° C.

In the process for forming an image disclosed in JP-A-11-231562, the recording sheet is constituted in such a manner that the glass transition temperature (Tg1) of the undercoating layer of the transparent resin layer satisfies the relationship, Tg1<50° C., and the glass transition temperature (Tg2) of the overcoating layer of the transparent resin layer satisfies the relationship, Tg2>60° C.

However, the foregoing conventional techniques involve the following problems. That is, the color image transfer material of JP-A-6-19178 shown in FIG. 12 has such a problem that, in the image transfer sheet 200 for forming a color image with three or more kinds of color toners, which has, on the surface thereof, a transparent resin layer 201 formed with a styrene-acrylic series resin containing a styrene-butadiene copolymer, when a color image is fixed on the image transfer material 200, a color image cannot be buried on the transparent resin layer 201 depending on the properties of the transparent resin layer 201, and therefore relief are formed on the color image formed on the image transfer material 200 to fail to provide sufficient gloss uniformity, It has another problem in that, depending on the addition amount of the styrene-butadiene copolymer contained in the transparent resin layer 201, formation of cracks cannot be certainly prevented.

In the case of the process for forming an image disclosed in JP-A-11-231562 as shown in FIG. 13, the recording sheet 300 has, at least on the surface of a substrate 301, on which a toner image is to be formed, a thermoplastic transparent resin layer 304 formed with two layers, i.e., an undercoating layer 302 and an overcoating layer 303, in which the relationships among the softening point (Tm2) of the undercoating layer 302 of the transparent resin layer 304, the softening point (Tm3) of the overcoating layer 303 of the transparent resin layer 304 and the softening point (Tm1) of the toner are specified, and the glass transition temperature (Tg1) of the undercoating layer 302 of the transparent resin layer 304 and the glass transition temperature (Tg2) of the overcoating layer 303 of the transparent resin layer 304 satisfy the relationships, Tg1<50° C. and Tg2>60° C. However, this technique involves such a problem that since the thermoplastic transparent resin layer 304 has the two-layer structure, the overcoating layer 303 cannot follow thermal expansion of the undercoating layer 302 when the thermal expansion coefficient of the undercoating layer 302 is larger, and therefore, cracks are formed in the case where the recording sheet 300 is placed in a high temperature environment.

SUMMARY OF THE INVENTION

The invention has been made in view of the foregoing circumstances and is to provide an electrophotographic transfer sheet and a process for forming a color image using the same, in which formation of relief of a toner image on the surface of the electrophotographic transfer sheet can be prevented to obtain sufficient high gloss and gloss uniformity, and formation of cracks on the surface of the electrophotographic transfer sheet can be prevented.

According to an aspect of the invention, the electrophotographic transfer sheet contains a substrate having one surface thereof an image receiving layer containing a thermoplastic resin as a main component, a resin constituting the image receiving layer having a melt viscosity at 120° C. of about from 200 to 2,000 Pa·s and an elongation after fracture of about 50% or more.

According to another aspect of the invention, the process for forming a color image contains the steps of: transferring a toner image containing a color toner on the image receiving layer of the electrophotographic transfer sheet of the invention; and fixing the toner image containing a color toner transferred to the image receiving layer of the electrophotographic transfer sheet by a belt type fixing unit to form a color image, the belt type fixing unit containing a fixing belt supported as being capable of circulating by plural rolls containing a heating roll, a pressure roll being in contact under pressure with the heating roll through the fixing belt, the electrophotographic transfer sheet being passed through the contact part under pressure between the fixing belt and the pressure roll to make the toner image face the fixing belt, so as to fix the toner image by heat and pressure, and the electrophotographic transfer sheet being released from the fixing belt under a condition where the fixing belt is cooled to a certain extent.

BRIEF DESCRIPTION OF THE DRAWINGS

A preferred embodiment of the invention will be described in detail based on the following figures, wherein:

FIG. 8 is a table showing the results of the examples;

DETAILED DESCRIPTION OF THE PREFERRED EMBODIMENT

A preferred embodiment of the invention will be described with reference to the drawings.

Embodiment

Figure 2:
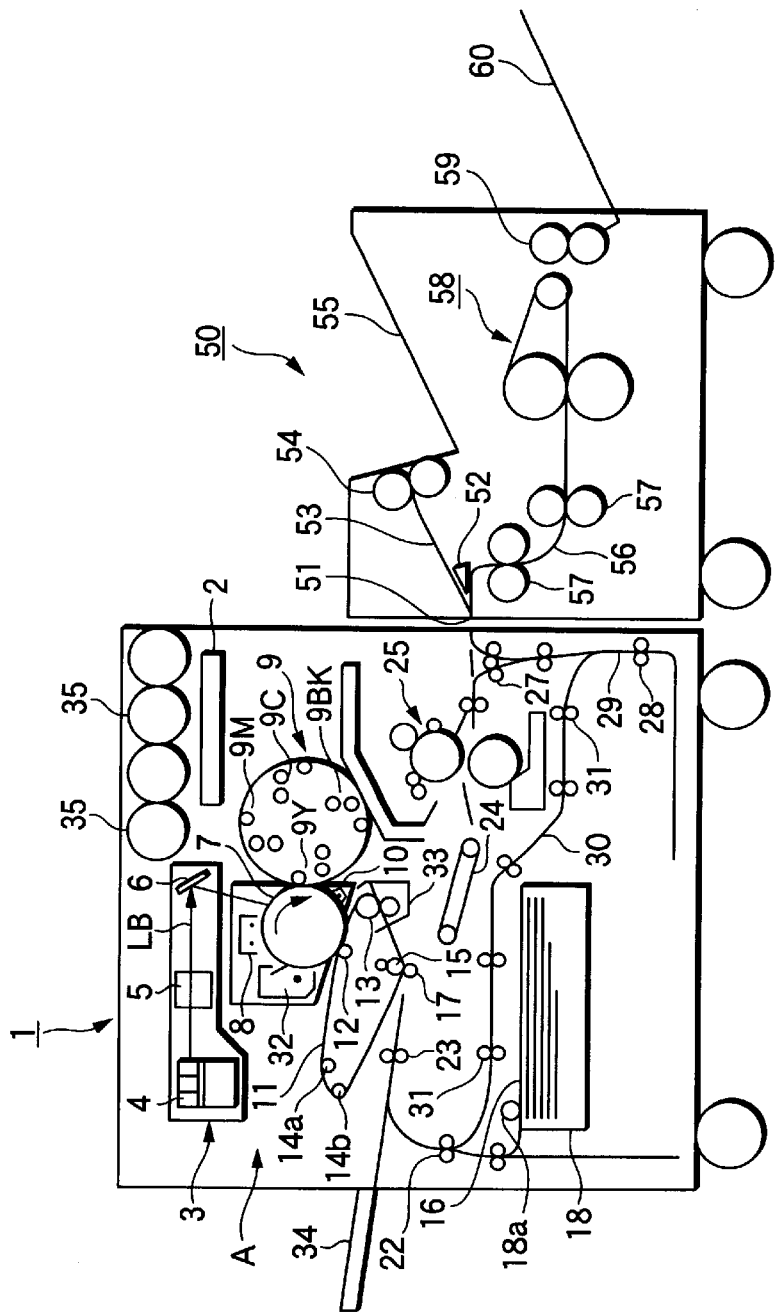
FIG. 2 is a constitutional diagram showing an apparatus for forming a color image, to which the electrophotographic transfer sheet according to the embodiment of the invention is applied.

FIG. 2 is a constitutional diagram showing an apparatus for forming a color image, to which the electrophotographic transfer sheet according to an embodiment of the invention is applied.

Color image information sent from a host computer, such as a personal computer, not shown in the figure or color image information of a color copy read by a reading unit not shown in the figure is input into an apparatus for forming a color image 1. In the apparatus for forming a color image 1, the input color image information is subjected to a prescribed image processing, such as shading correction, displacement correction, brightness and color space correction, gamma correction, frame deletion and color and movement revision, in an image processing unit 2 depending on necessity.

The image data having been subjected to the prescribe image processing in the image processing unit 2 is sent to a ROS (raster output scanner) 3 as color gradation data of four colors, i.e., yellow (Y), magenta (M), cyan (C) and black (BK) (8 bit for each), and image exposure is conducted in the ROS 3 with laser light corresponding to the color gradation data of the original copy.

An image forming unit A that can form plural toner images of different colors is arranged inside the apparatus for forming a color image 1. The image forming unit A is constituted mainly with a photoreceptor drum 7 as an image carrier, on which an electrostatic latent image is to be formed, a scorotron 8 as a charging unit for uniformly charging the surface of the photoreceptor drum 7 to a prescribed potential, the ROS 3 as an image exposure unit for subjecting the surface of the photoreceptor drum 7 to image exposure, and a rotary type developing unit 9 as a developing unit capable of forming toner images of different colors by developing the electrostatic latent image formed on the photoreceptor drum 7.

The ROS 3 modulates a semiconductor laser not shown in the figure corresponding to the color gradation data for reproduction of the original copy, and laser beam LB corresponding to the gradation data is emitted from the semiconductor laser as shown in FIG. 2. The laser beam LB emitted from the semiconductor laser is deflected and scanned by a rotating polyhedral mirror 4, so as to scan and expose the photoreceptor drum 7 as the image carrier through an f-θ lens 5 and a reflection mirror 6.

The photoreceptor drum 7 scanned and exposed with the laser beam LB by the ROS 3 is rotationally driven at a prescribed speed along with the direction shown by the arrow with a driving unit not shown in the figure. The surface of the photoreceptor drum 7 is previously charged to a prescribe polarity (for example, negative polarity) and a prescribed potential by the scorotron 8 as a charging unit for primary charging, and then scanned and exposed by the laser beam LB corresponding to the color gradation data for reproduction of the original copy, so as to form the electrostatic latent image. The electrostatic latent image formed on the photoreceptor drum 7 is reversibly developed by the rotary type developing unit 9 having developing devices 9Y, 9M, 9C and 9BK of four colors, yellow (Y), magenta (M), cyan (C) and black (BK), with, for example, toners (charging coloring material) charged to a negative polarity, which is the same as the charging polarity of the photoreceptor drum 7, whereby toner images of the prescribed colors are formed. A spherical toner having an average particle diameter of, for example, 5.5 µm is used in the respective developing devices 9Y, 9M, 9C and 9BK of the rotary type developing unit 9. The toner images formed on the photoreceptor drum 7 are charged to a negative polarity by a pre-transfer charging unit 10 depending on necessity, so as to adjust the charged amount.

The toner images of the respective colors formed on the photoreceptor drum 7 are transferred and accumulated on an intermediate transfer belt 11 as an intermediate transfer material arranged under the photoreceptor drum 7 by a primary transfer roll 12 as a first transfer unit. The intermediate transfer belt 11 is supported by a driving roll 13, a following roll 14a, a tension roll 14b and a backup roll 15 as a counter roll constituting a part of a secondary transfer unit and is capable of circulating in the direction of the arrow at the same moving speed as the peripheral speed of the photoreceptor drum 7.

All or part of the toner images of the four colors, yellow M, magenta (M), cyan (C) and black (BK) to be formed on the photoreceptor drum 7, depending on the color of the image to be formed, are transferred on the intermediate transfer belt 11 by the primary transfer roll 12 in the conditions where the toner images are consecutively accumulated. The toner images transferred to the intermediate transfer belt 11 are transferred to an electrophotographic transfer sheet 16 as a recording sheet transported to the secondary transfer position at the prescribed timing by a contact pressure force and an electrostatic attraction force of the backup roll 15 supporting the intermediate transfer belt 11 and the secondary transfer roll 17 constituting a part of the secondary transfer unit and being in contact with the backup roll 15 under pressure. The electrophotographic transfer sheet 16 having the prescribed size is supplied by a feeding roll 18a from a paper supplying cassette 18 as a transfer sheet storing member arranged at a lower part of the apparatus for forming a color image 1 as shown in FIG. 2. The thus supplied electrophotographic transfer sheet 16 is transported to the secondary transfer position of the intermediate transfer belt 11 at the prescribed timing by plural transporting rolls 22 and a resist roll 23. The toner images of the prescribed colors are then transferred all at once from the intermediate transfer belt 11 to the electrophotographic transfer sheet 16 by the backup roll 15 and the secondary transfer roll 17 as the secondary transfer unit.

The electrophotographic transfer sheet 16 having the toner images of the prescribed colors transferred from the intermediate transfer belt 11 is separated from the intermediate transfer belt 11 and then transported to a fixing unit 25 by a transporting belt 24, and the toner images are fixed to the electrophotographic transfer sheet 16 by the fixing unit 25 with heat and pressure, which is then discharged to the outside of the machine, in the case of single sided printing, to complete the process for forming a color image.

In the case of double sided printing, the electrophotographic transfer sheet 16 having a color image formed on the first surface (front surface) is not discharged to the outside of the machine but is changed in transfer direction downward by an inversion gate not shown in the figure, and is once transported to an inversion path 29 by a triroll 27 constituted by three rolls and an inversion roll 28. The electrophotographic transfer sheet 16 is then transported to a double sided printing path 30 by the inversion roll 28 inversely rotating, and is once transported to the resist roll 23 by a transporting roll 31 provided in the double sided printing path 30, followed by stopping. The electrophotographic transfer sheet 16 is then again started to be transported by the resist roll 23 synchronized with the toner images on the intermediate transfer belt 11, and a transferring and fixing process of the toner images is conducted on the second surface (back surface) of the electrophotographic transfer sheet 16, which is then discharged to the outside of the machine.

In FIG. 2, numeral 32 denotes a cleaning unit for removing remaining toners and paper waste from the surface of the photoreceptor drum 7 after completing the transfer process, 33 denotes a cleaner for the intermediate transfer belt for cleaning the intermediate transfer belt 11, 34 denotes a multi sheet inserter, and 35 denotes a toner cartridge containing toners of the respective colors, yellow (Y), magenta (M), cyan (C) and black (BK).

The electrophotographic transfer sheet used in this embodiment contains a substrate having one surface thereof an image receiving layer containing a thermoplastic resin as a main component, in which a resin constituting the image receiving layer has a melt viscosity at 120° C. of from 200 to 2,000 Pa·s and an elongation after fracture of 50% or more.

The electrophotographic transfer sheet used in this embodiment has a thickness of the image receiving layer of about from 7 to 20 μm.

Figure 3:
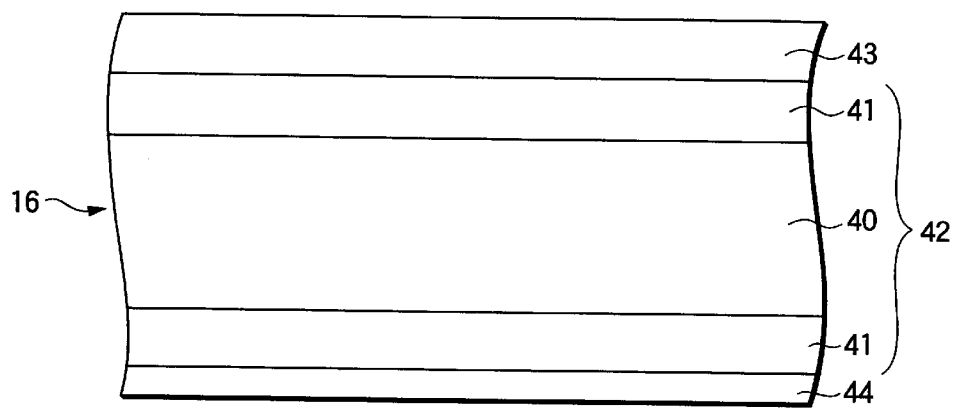
FIG. 3 is a constitutional diagram showing the embodiment of the electrophotographic transfer sheet.

That is, the electrophotographic transfer sheet 16 contains, for example, as shown in FIG. 3, a photographic paper substrate 42 as a base, which is obtained by forming coating layers 41 formed with polyethylene (PE) having a thickness of from 20 to 30 μm on both surfaces of a support 40 formed with high quality paper having a thickness of 150 μm, having one surface (front surface) thereof an image receiving layer (transparent resin layer) 43 formed by coating with a composition mainly containing a thermoplastic resin, such as polyester, to a thickness in the range of from 7 to 20 μm, for example to a thickness of 12 μm.

On the back surface of the electrophotographic transfer sheet 16, as shown in FIG. 3, a back layer 44 is provided depending on necessity to make possible to write thereon with a pencil or a ball point pen. The electrophotographic transfer sheet 16 used herein has a basis weight of from 190 to 230 g/m², but one having a basis weight outside the range can also be used. The back layer 44 may not be provided.

Figure 1:
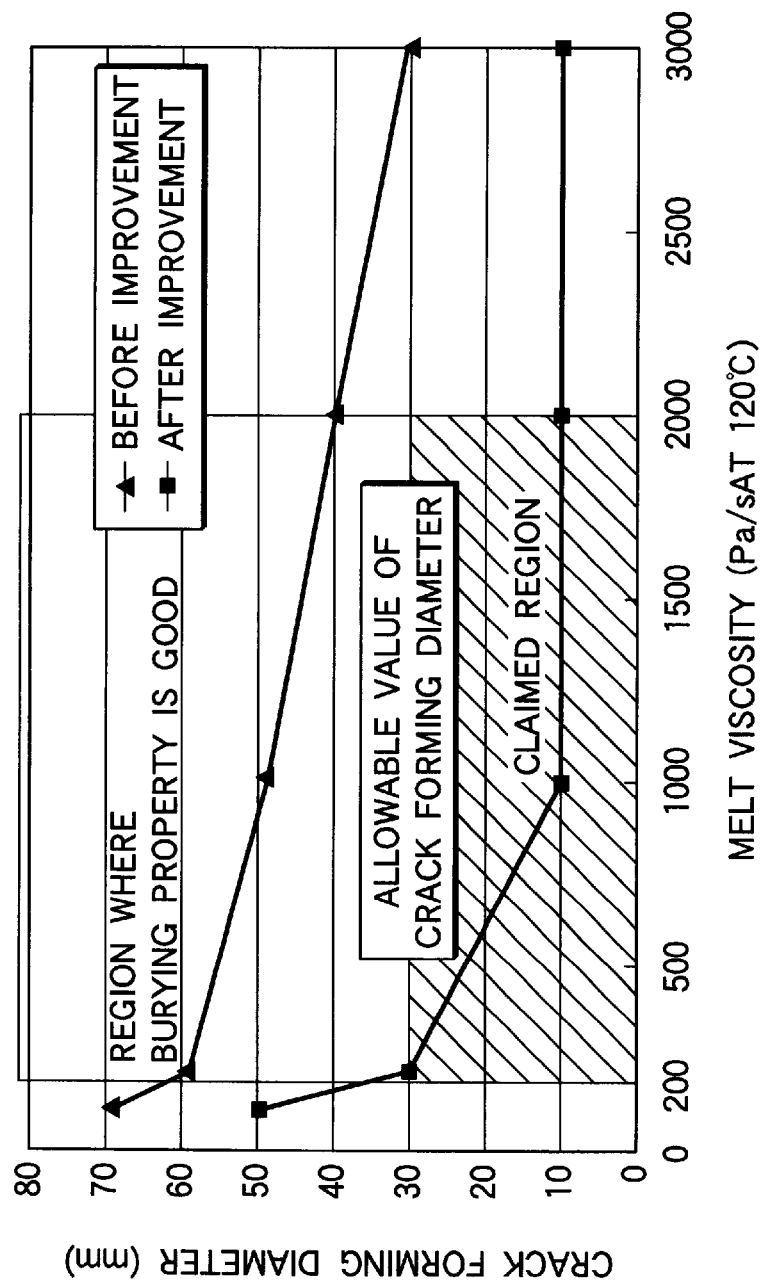
FIG. 1 is a graph showing the relationship between the melt viscosity and the crack forming diameter of the resin constituting the image receiving layer of the electrophotographic transfer sheet according to an embodiment of the invention.

The electrophotographic transfer sheet 16, as shown in FIG. 1, is adjusted to have the melt viscosity at 120° C. of the thermoplastic resin, such as polyester, constituting the image receiving layer 43 (transparent resin layer) of from 200 to 2,000 Pa·s. The melt viscosity of the thermoplastic resin, such as polyester, constituting the image receiving layer 43 (transparent resin layer) is measured in such a manner that the viscosity of the resin is measured by a flow tester produced by Shimadzu Corp. with variation of temperatures, and the viscosity at 120° C. is designated as the melt viscosity in the invention.

When the melt viscosity at 120° C. of the thermoplastic resin, such as polyester, constituting the image receiving layer 43 (transparent resin layer) exceeds 2,000 Pa·s, burying of the color toner image becomes insufficient, and relief of the color toner image are formed on the surface of the image receiving layer 43. (transparent resin layer), so as to deteriorate the gloss uniformity. When the melt viscosity at 120° C. of the thermoplastic resin, such as polyester, constituting the image receiving layer 43 (transparent resin layer) is less than 200 Pa·s, the image receiving layer 43 (transparent resin layer) after fixing is too closely contact with the fixing belt describe later, and it is difficult to release the electrophotographic transfer sheet from the fixing belt.

However, even when the melt viscosity at 120° C. of the thermoplastic resin, such as polyester, constituting the image receiving layer 43 (transparent resin layer) of the electrophotographic transfer sheet 16 is set in the range of from 200 to 2,000 Pa·s, there are cases where formation of cracks can not satisfy the allowable value of crack forming diameter as is understood from the measurement results of formation of cracks described later.

Figure 16:
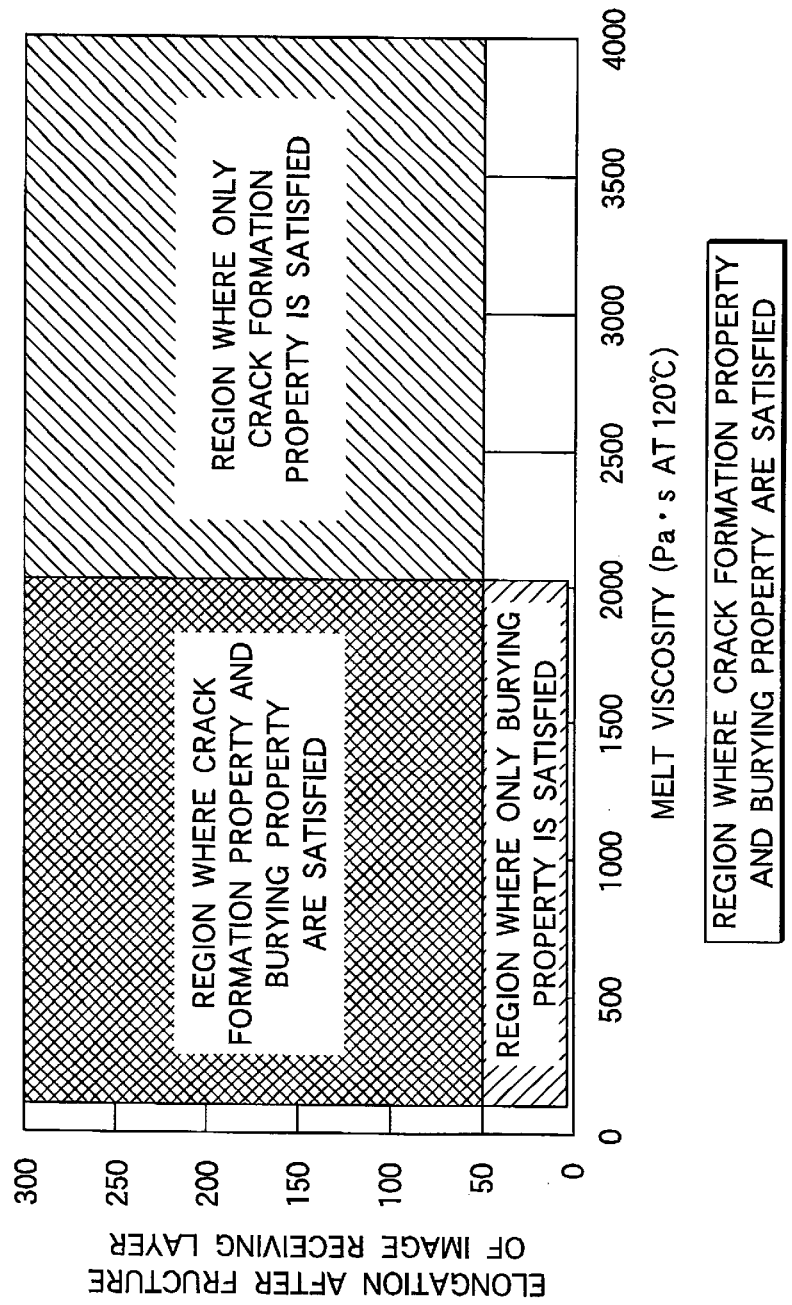
FIG. 16 is a graph showing the relationship between the melt viscosity and the elongation after fracture of the image receiving layer.

Under the circumstances, the inventors have noted the elongation after fracture of the thermoplastic resin, such as polyester, constituting the image receiving layer 43 (transparent resin layer), and have found that when the elongation after fracture of the thermoplastic resin is 50% or more, the formation of cracks can be suppressed to the allowable value. FIG. 16 is a graph showing the range where the melt viscosity at 120° C. of the thermoplastic resin, such as polyester, constituting the image receiving layer 43 (transparent resin layer) is in the range of from 200 to 2,000 Pa·s, and the range where the elongation after fracture of the thermoplastic resin is 50% or more.

It is preferred that the electrophotographic transfer sheet 16 has the support 40 having an increased internal bonding strength of paper, and improvement of the internal bonding strength of the paper 40 can be conducted by various manners, which are selected depending on necessity, such as addition of the kind of pulp of the paper (softwood pulp having high rigidity), heat-treated pulp and a paper strengthening agent (such as, polyamide, acrylamide and amine compounds) or a wet paper strength increasing agent (such as polyamide, epoxy and melamine compounds) advancing beating to increase inter-fiber bonding strength, or soakage or coating of an aqueous resin (polyvinyl alcohol, a fluorine resin, an acrylic compound, a styrene compound, an acrylic-styrene copolymer, and amide, urethane and epoxy compounds) by size press.

One of the characteristic features of the image receiving layer 43 (transparent resin layer) of the invention is that the gloss of the image recording part is uniform. In the case where the toner is not buried in the electrophotographic transfer sheet 16 upon fixing the toner, the gloss is changed by the difference in thickness of the toner to remarkably deteriorate the image quality. Therefore, it is important to bury the toner in the image receiving layer 43 to avoid gloss nonuniformity. That is, in order to bury the toner, it is necessary that the toner is sufficiently melted, and the transparent resin constituting the image receiving layer 43 is softened to become compatible with the toner by heating for a short period of time. The inventors have found as a result of earnest investigations in this respect that it is preferred that a resin mainly containing a polyester resin is used as the image receiving layer 43.

Examples of the resin constituting the image receiving layer 43 (transparent resin layer) include a polyester resin, a styrene-acrylate resin and a styrene-methacrylate resin, and a polyester resin is particularly preferably used. Examples of a polyhydric alcohol and a polyvalent carboxylic acid constituting the polyester resin include the following.

Examples of the polyhydric alcohol include ethylene glycol, propylene glycol, 1,4-butanediol, 2,3-butanediol, diethylene glycol, triethylene glycol, 1,5-pentanediol, 1,6-hexanediol, neopentylene glycol, 1,4-cyclohexanedimethanol, dipropylene glycol, polyethylene glycol, polypropylene glycol and a monomer obtained by adding an olefin oxide to bisphenol A.

Examples of the polyvalent carboxylic acid include maleic acid, maleic anhydride, fumaric acid, phthalic acid, terephthalic acid, isophthalic acid, malonic acid, succinic acid, glutaric acid, dodecenylsuccinic acid, n-octylsuccinic acid, n-dodecenylsuccinic acid, 1,2,4-benzenetricarboxylic acid, 1,2,4-cyclohexanetricarboxylic acid, 1,2,4-naphthalenetricarboxylic acid, 1,2,5-hexanetricarboxylic acid, 1,3-dicarboxy-2-methyl-2-methylenecarboxypropane, tetra(methylenecarboxy)methane, 1,2,7,8-octanetetracarboxylic acid, trimellitic acid, pyromellitic acid and a lower alkyl ester of these acids.

The polyester series resin used in the invention is synthesized from at least one kind selected from each of the polyhydric alcohol components and the polyvalent carboxylic acid components. While the primary component of the toner includes a polyester resin in the case of a color toner or a styrene-acrylic series resin in the case of a monochrome toner, it is preferred to select a resin composition that has high compatibility with the toner. Therefore, one kind or two or more kinds are selected from a polyester resin, a styrene-acrylate resin and a styrene-methacrylate resin, and are used as a mixture.

The image receiving layer 43 (transparent resin layer) may contain a pigment, a releasing agent and an electroconductive agent in an amount range where the transparency is not inhibited. In this case, the amount of the resin as the primary component is necessarily 80% by weight or more based on the total amount of the resin. As a releasing agent, for example, carnauba wax, polyethylene wax, monoester wax and amide wax may be added in an amount of from 0.5 to 10% by weight.

Ordinary high quality paper is used as the support 40 of the substrate of the invention. On both the front and back surfaces of the support 40, coating layers 41 formed with polyethylene, polypropylene, styrene-butadiene rubber (SBR), polyethyleneterephthalate or polystyrene are coated to a thickness of from 10 to 30 $\mu$m. After coating, the coating layers 41 are subjected to a smoothening treatment by ordinary hardening or surface treating process. The surface, on which the transparent resin layer 43 is to be coated, is adjusted to have a maximum roughness Rmax based on JIS K0601 of 20 $\mu$m or less upon conducting the smoothening treatment.

The back layer 44 is formed by thinly coating an inorganic pigment added with an adhesive, such as a polyester resin, to a prescribed thickness. Examples of the pigment used in the back layer 44 include a mineral pigment, such as calcium carbonate, precipitated calcium carbonate, kaolin, fused kaolin, delaminated kaolin, talc, calcium sulfate, barium sulfate, titanium dioxide, zinc oxide, alumina, magnesium carbonate, magnesium oxide, silica, magnesium aminosilicate, calcium silicate fine particles, magnesium carbonate fine particles, light calcium carbonate fine particles, white carbon, bentonite, zeolite, sericite and smectite, and an organic pigment, such as a polystyrene resin, a styrene-acrylic copolymer resin, a urea resin, a melamine resin, an acrylic resin, a vinylidene chloride resin, benzoguanamine resin, fine hollow particles thereof and through-type particles thereof, and one kind or two or more kinds are selected from these pigments and used.

The adhesive used in the back layer 44 is selected under consideration of the adhesiveness between the substrate 42 of the photographic paper and the coating layer 41, and examples thereof include a synthetic polymer compound, such as a polyester resin, a polyurethane resin, a polyamide resin, an olefin-maleic anhydride resin, a polyolefin resin and a melamine resin, with a polyester resin being preferred.

The mixed proportion of the adhesive used in the back layer 44 is from 100 to 400% by weight per 20% by weight of the pigment.

The back layer 44 preferably contains a releasing agent and a lubricating agent in an amount range of from 0.5 to 5 parts by weight per 100 parts by weight of the inorganic pigment. When the mixed amount of the releasing agent or the lubricating agent is less than 0.5 part by weight, the contact strength between the image receiving layer 43 (transparent resin layer) and the back layer 44 is increased to raise the friction coefficient of paper, whereby the running stability is deteriorated. When it exceeds 5 parts by weight, formation of paper powder due to reduction of the strength of the back layer 44 causes a problem.

Examples of the releasing agent and the lubricating agent used in this embodiment include a higher fatty acid, such as stearic acid, a metallic salt of a higher fatty acid, such as zinc stearate, a higher fatty acid amide and a methylolated product thereof, such as stearic amide, and a hydrogen carbonate, such as polyethylene wax.

In the coating composition for the back layer 44, various additives other than the foregoing may be used appropriately depending on necessity, examples of which include a surface active agent, a pH adjusting agent, a viscosity adjusting agent, a softening agent, a gloss imparting agent, wax, a dispersant, a flow stabilizer, a conduction preventing agent, a stabilizer, an antistatic agent, a crosslinking agent, a sizing agent, a fluorescent whitening agent, a coloring agent, an ultraviolet absorbent, a defoaming agent, a waterproofing agent, a plasticizer, a lubricating agent, an antiseptic agent and a perfumery.

The coating amount of the back layer 44 is selected depending on the usage of the transfer sheet of the invention with consideration of the curling balance, and it is generally necessary that unevenness on the both surfaces of the support 40 is completely covered with the coating layers 41, and is preferably from 8 to 40 g/m$^2$ in terms of dry weight As the coating method for forming the back layer 44, an ordinary known coating machines such as a blade coater, an air knife coater, a roll coater, a reverse roll coater, a bar coater, a curtain coater, a die slot coater, a gravure coater, a Champlex coater, a brush coater, a two-roll coater, a size press coater of a metering blade type, a Billblade coater, a Shortwell coater and a gate roll coater may be appropriately used.

The smoothening treatment of the back layer 44 can be conducted by an ordinary apparatus for a smoothening treatment, such as a super calender, a gloss calender and a soft calender, without particular difficulty. The apparatus may be appropriately used on-machine or off-machine, and the mode of the pressurizing unit, the number of pressure nips and heating are appropriately adjusted according to an ordinary apparatus for a smoothening treatment.

The support 40 used in the substrate 42 of the invention is not particularly limited, and a paper support, such as acid paper made at pH of about 4.5 and a acid-free paper made at weakly acidic condition of about pH 6 to weakly alkaline condition of about pH 9 containing an alkaline filler, such as calcium carbonate, as a primary component, is employed. In the paper making process, an ordinary paper making machine, such as a Fourdrinier multi-tube type, a cylinder single tube type or a Yankee machine type, is appropriately used. Synthetic paper, nonwoven fabric and a synthetic resin film may also be used depending on the usage.

The coating of the image receiving layer 43 (transparent resin layer) on the substrate 42 is conducted by an ordinary known coating machine, such as a reverse roll coater, a bar coater, a curtain coater, a die slot coater or a gravure coater.

The sheet 16 coated with the image receiving layer 43 (transparent resin layer) can be subjected to a smoothening treatment depending on necessity, which is conducted by an ordinary smoothening machine, such as a super calender, a gloss calender or a softening calender. The mode of the pressurizing unit, the number of pressure nips and heating are appropriately adjusted according to an ordinary apparatus for a smoothening treatment.

On the electrophotographic transfer sheet 16, which is constituted as described in the foregoing, a fill color toner image is transferred and fixed by the apparatus for forming a color image 1 as shown in FIG. 2, which is configured in such a manner that the electrophotographic transfer sheet 16 having the full color toner image transferred and fixed thereon is then applied to the secondary fixing by a belt type fixing unit. The belt type fixing unit may be used in the form of the fixing unit 25 arranged inside the apparatus for forming a color image 1 but not as a fixing unit for conducting secondary fixing, and in this case, there is no necessity to conduct the secondary fixing.

In this embodiment, the belt type fixing unit is constituted in such manner that a fixing belt is supported as being capable of circulating by plural rolls containing a heating roll and a pressure roll is in contact under pressure with the heating roll through the fixing belt. The electrophotographic transfer sheet is passed through the contact part under pressure between the fixing belt and the pressure roll to make the toner image face the fixing belt, so as to fix the toner image by heat and pressure, and the electrophotographic transfer sheet being released from the fixing belt under a condition where the fixing belt is cooled to a certain extent.

FIG. 2 also shows a secondary fixing unit used in combination with the apparatus for forming a color image 1.

The secondary fixing unit 50 has an inlet 51, from which the electrophotographic transfer sheet 16 discharged from the apparatus for forming a color image 1, and a switching gate 52 for switching the transporting path of the electrophotographic transfer sheet 16 is provided inside the inlet 51. In the case where the electrophotographic transfer sheet 16 discharged from the apparatus for forming a color image 1 is discharged to an external first output tray without conducting the secondary fixing, the transporting path is switched to an upper first transporting path 53 by the switching gate 52, and the transfer sheet is discharged to a first output tray 55 by an output roll 54. In the case where the electrophotographic transfer sheet 16 discharged from the apparatus for forming a color image 1 is subjected to the secondary fixing, the transporting path is switched to a lower second transporting path 56 by the switching gate 52, and the transfer sheet is transported to a belt type fixing unit 58 by plural transporting rolls 57, the transfer sheet is subjected to the fixing treatment by the belt type fixing unit 58, followed by being discharged to a second output tray 60 by an output roll 59.

Figure 4:
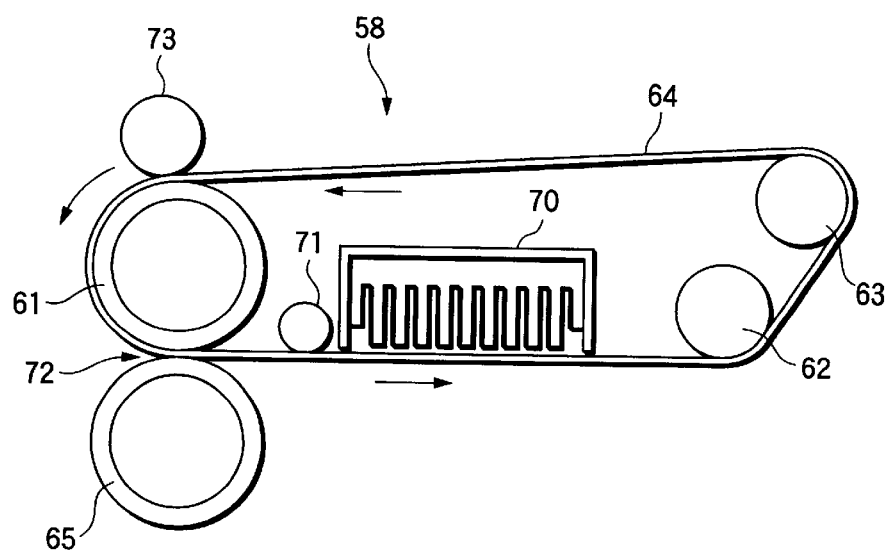
FIG. 4 is a constitutional diagram showing a belt type fixing unit of the apparatus for forming a color image according to the embodiment of the invention.

FIG. 4 shows the belt type fixing unit arranged inside the secondary fixing unit 50.

As shown in FIG. 4, the belt type fixing unit 58 has a flexing belt 64 supported as being capable of circulating by a heating roll 61 and plural rolls 62 and 63 containing the heating roll 61, and a pressure roll 65 being in contact under pressure with the heating roll 61 through the fixing belt 64.

Figure 5:
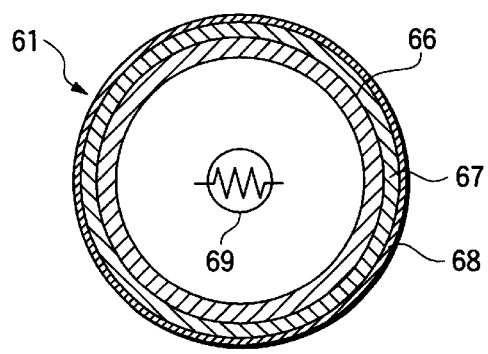
FIG. 5 is a cross sectional view showing a heating roll and a pressure roll.

The heating roll 61 used is constituted, as shown in FIG. 5, with a metallic core 66 formed with aluminum or stainless steel having formed on the surface thereof an elastic layer 67 formed with silicone rubber having a rubber hardness of from 20 to 60° to a thickness of from 1 to 3 mm, and a releasing layer 68 formed with a PFA tube on the surface of the elastic layer 67, so as to be formed into a prescribed outer diameter (for example, 50 mm). A halogen lamp 69 of from 300 to 350 W as a heating source is arranged inside the heating roll 61, and the heating roll 61 is heated from the inside thereof to have a prescribed surface temperature (about from 155 to 195° C.).

As the pressure roll 65, a roll that is similarly constituted as the heating roll 65 shown in FIG. 5 is used, which formed with a metallic core 66 formed with aluminum or stainless steel having formed on the surface thereof an elastic layer 67 formed with silicone rubber having a rubber hardness of from 20 to 60° to a thickness of from 1 to 3 mm, and a releasing layer 68 formed with a PFA tube on the surface of the elastic layer 67, so as to be formed into a prescribed outer diameter (for example, 50 mm). A halogen lamp 69 of from 300 to 350 W as a heating source is arranged inside the pressure roll 65, and the pressure roll 65 is heated from the inside thereof to have a prescribed surface temperature (about from 85 to 135° C.).

The heating roll 61 and the pressure roll 65 are made in contact with each other through the fixing belt 64 under pressure with a load of from 75 to 200 kg by a pressing unit not shown in the figure.

The fixing belt 64 is supported as being capable of circulating by the plural rolls including the heating roll 61, a releasing roll 62 and a walk controlling roll 63, and is circulated at a prescribed moving speed (30 mm/sec) by the heating roll 61 rotationally driven by a driving source not shown in the figure. The fixing belt 64 is constituted with, for example, an endless film formed with polyimide having a thickness of 80 μm having coated thereon a silicone rubber layer having a thickness of 50 μm.

A heatsink 70 for forcedly cooling the fixing belt 64 is arranged on the inner surface of the fixing belt between the heating roll 61 and the releasing roll 62, and a cooling and sheet transporting unit for cooling and transporting the transfer sheet 16 is constituted with the heatsink 70 for cooling. The fixing belt 64 is cooled near the releasing roll 62 to a temperature of about from 50 to 80° C.

A tension roll 71 having a small diameter for imparting a constant tension to the fixing belt 64 is arranged between the heatsink 70 for cooling and the heating roll 61.

Figure 6:
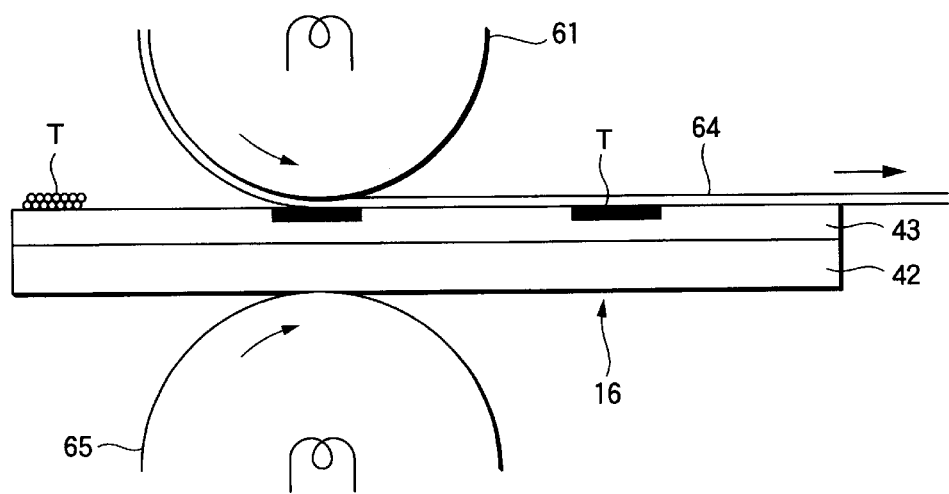
FIG. 6 is a diagram showing the state of fixing in the electrophotographic transfer sheet.

In the belt type fixing unit 58, as shown in FIG. 4, the electrophotographic transfer sheet 16 having a color toner image T transferred and fixed on the surface thereof is introduced to a pressure contact part 72 (nip part), at which the heating roll 61 is in contact under pressure with the pressure roll 65 being in contact with the heating roll 61 under pressure through the fixing belt 64, in such a manner that the color toner image T faces the heating roll 61, and during the transfer sheet passes through the pressure contact part 72 of the heating roll 61 and the pressure roll 65, as shown in FIG. 6, the color toner image T is melted by heating and fixed on the electrophotographic transfer sheet 16. At this time, the image receiving layer 43 (transparent resin layer) formed on the surface of the electrophotographic transfer sheet 16 is also softened by heating, and is closely in contact with the surface of the fixing belt 64.

Thereafter, the image receiving layer 43 (transparent resin layer) is melted by heating at the pressure contact part 72 of the heating roll 61 and the pressure roll 65, and the electrophotographic transfer sheet 16 having the color toner image T fixed on the image receiving layer 43 (transparent resin layer) is transported along with the fixing belt 64 under such a state that the image receiving layer 43 (transparent resin layer) on the surface of the transfer sheet is closely in contact with the surface of the fixing belt 64. During the transportation, the fixing belt 64 is forcedly cooled by the heatsink 71 for cooling, whereby the color toner image T and the image receiving layer 43 (transparent resin layer) are solidified by cooling and released by the releasing roll 62 utilizing the sturdiness (rigidity) of the transfer sheet 16 itself.

The remaining toner is removed from the surface of the fixing belt 64 after completing the releasing process by a cleaner 73, and the fixing belt is prepared for the next fixing process.

The electrophotographic transfer sheet 16 in this embodiment is adjusted to have a melt viscosity at 120° C. of the thermoplastic resin, such as polyester, constituting the image receiving layer 43 (transparent resin layer) being from 200 to 2,000 Pa·s as shown in FIG. 1.

When the melt viscosity at 120° C. of the thermoplastic resin, such as polyester, constituting the image receiving layer 43 (transparent resin layer) exceeds 2,000 Pa·s, burying of the color toner image becomes insufficient to form relief of the color toner image on the surface of the image receiving layer 43 (transparent resin layer), so as to lower the gloss. When the melt viscosity at 120° C. of the thermoplastic resin, such as polyester, constituting the image receiving layer 43 (transparent resin layer) is less than 200 Pa·s, it is not preferred since the image receiving layer 43 (transparent resin layer) after fixing is too closely in contact with the fixing belt, whereby it is difficult to release the electrophotographic transfer sheet from the fixing belt. The melt viscosity is preferably in the range of from 200 to 1,000 Pa·s.

Even when the melt viscosity at 120° C. of the thermoplastic resin, such as polyester, constituting the image receiving layer 43 (transparent resin layer) of the electrophotographic transfer sheet 16 is set within the range of from 200 to 2,000 Pa·s, there are cases, depending on the elongation of the thermoplastic resin, such as polyester, constituting the image receiving layer 43 (transparent resin layer), where the formation of cracks can not satisfy the allowable value of crack forming diameter as understood from the measurement results of the formation of cracks described later as in FIG. 1.

Under the circumstances, the inventors have noted the elongation after fracture of the thermoplastic resin, such as polyester, constituting the image receiving layer 43 (transparent resin layer), and have found as a result of earnest investigations that when the elongation after fracture of the thermoplastic resin is 50% or more, the formation of cracks can be suppressed to the allowable value.

EXAMPLES

Examples of the invention will be specifically described below. All "part" and "percent" in the examples are "part by weight" and "percent by weight", respectively, unless otherwise indicated.

Preparation of Electrophotographic Transfer Sheet
Preparation of Support

To 100 parts of pulp slurry of LBKP (freeness (CSF)=480 ml) are added 10 parts of light calcium carbonate, 0.05 part of alkenium succinic anhydride (Fiberan 81, a trade name, produced by Oji National Co., Ltd.), 1.2 parts of cationated starch (Ace K, a trade name, produced by Oji National Co., Ltd.) and 0.4 part of aluminum sulfate as loading materials, and the resulting mixture is diluted with white water to prepare a paper forming composition having a pH of 7.0 and a solid concentration of 1.1%. The paper forming composition is subjected to paper making by a Fourdrinier type paper making machine. A size press liquid of oxidized starch (Ace A, a trade name, produced by Oji National Co., Ltd.) having a liquid concentration of 6% is coated thereon by a size press machine to a coating amount of 2.0 g/m² in terms of dry weight, followed by drying, and then it is subjected to a smoothening treatment to have a Beck smoothness of 40 seconds by a machine calender, so as to obtain paper having a basis weight of 140 g/m² and a thickness of 160 μm.

Preparation of Substrate

On the both front and back surfaces of the thus prepared support 40, a polyethylene resin is coated and hardened in a film form of a thickness of 20 μm to form coating layers 41, so as to prepare a substrate 42 as a base of photographic paper. The substrate 42 as the base of photographic paper has a thickness of 200 μm.

Formation of Back Layer Formed on Back Surface to Coated Transparent Resin Layer Aqueous dispersion (solid content: 20%) of polyester resin of aqueous dispersion system (WR-905, a trade name, produced by Nippon Synthetic Chemical Industry Co., Ltd.) 75 parts Light calcium carbonate (Brilliant S15, a trade name, produced by Shiraishi Calcium Co., Ltd.) 3 parts Surface active agent (Sandet BL, a trade name, produced by Sanyo Chemical Industries, Ltd.) 0.1 part Pure water 21.9 parts A coating composition containing the foregoing components is prepared and coated on the back surface of the substrate 42 to a dry weight of 10 g/m² by a bar coater to make a basis weight of 190 g/m².

Preparation of Transparent Resin Layer on Substrate

The following polyester resin is coated by a gravure coater to a thickness after drying of 12 μm to form an image receiving layer 43 (transparent resin layer).

The polyester resin thus coated may be a commercially available polyester resin (TP220, a trade name, produced by Nippon Synthetic Chemical Industry Co., Ltd.) but is not limited to TP220, and it is appropriately selected depending on the elongation and the melt viscosity. The selected resin is coated, and the formation of cracks and the burying property of a toner image have been confirmed.

Evaluation of Burying Property of Toner Image and Formation of Cracks of Electrophototraphic Transfer Sheet Experiments are conducted for evaluation of the burying property of a toner image and formation of cracks using the electrophotographic transfer sheet 16 thus prepared, in which the thermoplastic resin formed with polyester constituting the image receiving layer 43 (transparent resin layer) is changed to those having various values of melt viscosity at 120° C. Experiments are also conducted for valuation of the burying property of a toner image and formation of cracks by using a belt fixing unit after forming an image in the electrophotographic transfer sheet 16 thus prepared, in which the thermoplastic resin formed with polyester constituting the image receiving layer 43 (transparent resin layer) is changed to those having various values of elongation after fracture.

Figure 7A:
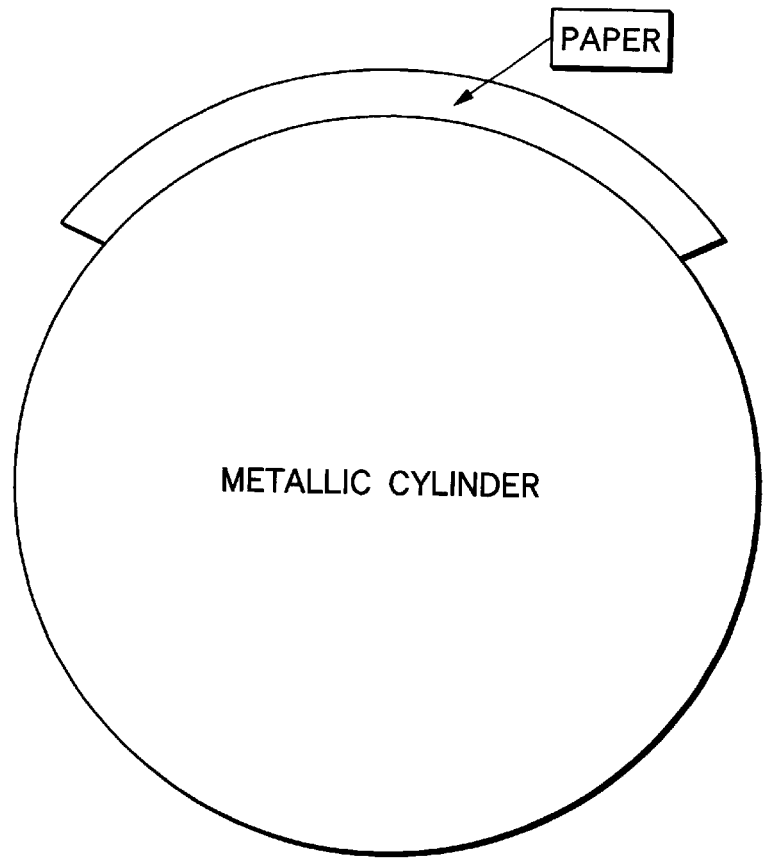
FIGS. 7A and 7B are schematic diagrams showing an apparatus and a method for measuring crack forming diameter.
Figure 7B:
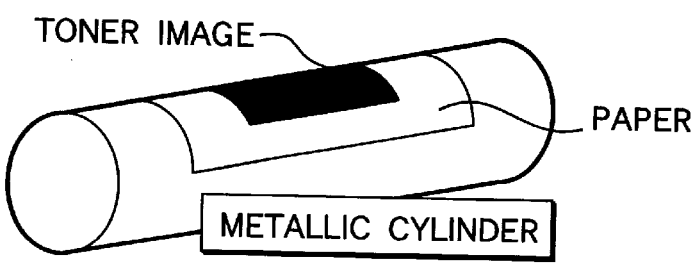

The formation of cracks is evaluated in the following manner. As shown in FIGS. 7A and 7B, the electrophotographic transfer sheet 16 is slowly wound on the outer surface of a metallic cylinder having a prescribed diameter in such a manner that the image receiving layer 43 turns up and is maintained for 10 seconds. Confirmation is conducted with the naked eye as to whether or not cracks are formed on the surface of a Process Black(Pk) image of the image receiving layer 43, and in the case where cracks are formed, the diameter of the metallic cylinder is designated as the crack forming diameter. In the case where no crack is formed with the metallic cylinder, the transfer sheet 16 is wound on another metallic cylinder having a smaller diameter in the similar manner to confirm formation of cracks. The Pk image herein means a black image formed by accumulating toners of respective colors of yellow, magenta and cyan. The measurement environment is that defined by JIS (temperature: 23° C., humidity: 50% RH).

Figure 14:
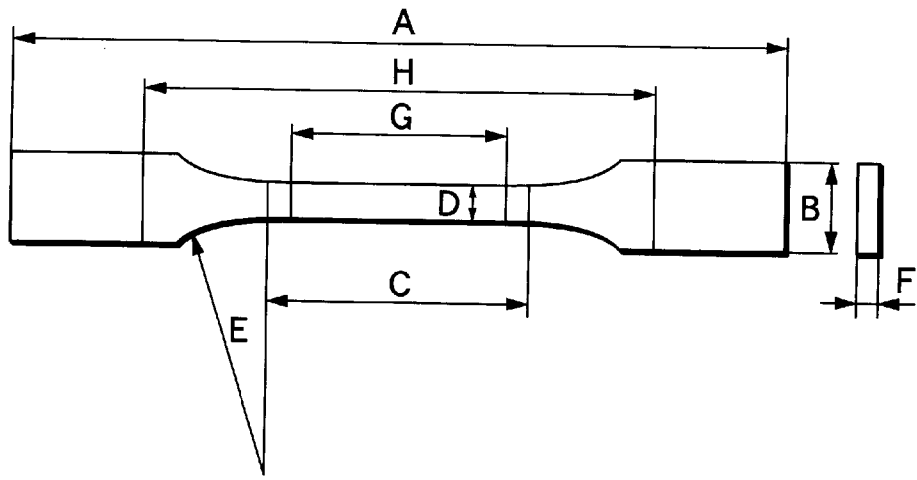
FIG. 14 is a schematic diagram for preparation of a test sample used in the tensile test of plastics.

The elongation after fracture of the thermoplastic resin formed with polyester constituting the image receiving layer 43 (transparent resin layer) is measured in the following manner. A test sample shown in FIG. 14 is prepared with the polyester resin constituting the image receiving layer 43

Figure 15:
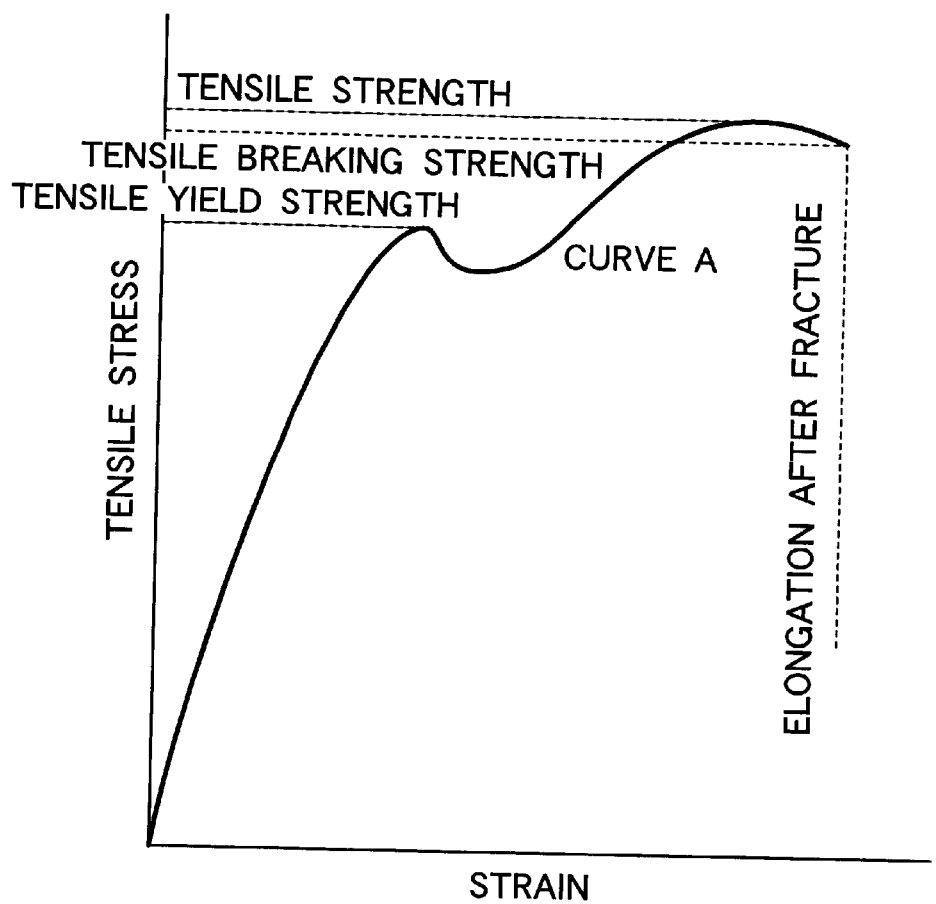
FIG. 15 is a graph showing the relationship between the tensile stress and the strain.

(transparent resin layer), and the test sample is mounted on a tensile test machine to conduct a tensile test according to the method of a tensile test of plastics of JIS K7113, whereby the elongation after fracture is measured based on the tensile stress-strain curve shown in FIG. 15.

The results obtained are shown in FIG. 1 and FIG. 8.

It is understood from FIG. 1 and FIG. 8 as follows. In the cases of Examples 1 to 4, the elongation after fracture of the polyester resin constituting the image receiving layer 43 is 50% or more in all the Examples, and the melt viscosity of the polyester resin constituting the image receiving layer 43 is 1,000 (Pa·s), 400 (Pa·s), 2,000 (Pa·s) or 200 (Pa·s). With respect to the burying property of an image, only Example 2 is designated as the grade B involving no practical problem, in which relief on the image are somewhat notable, but relatively uniform gloss is obtained, but the other examples are designated as the grade A, in which there is no relief on the image and uniform gloss is obtained. With respect to the formation of cracks, the crack forming diameter is not more than 30 mm, which is the allowable value, in all the examples. The reason why with respect to the burying property of an image, only Example 2 is designated as the grade B involving no practical problem, in which relief on the image are somewhat notable, but relatively uniform gloss is obtained, is considered that the thickness of the image receiving layer 43 is as thin as 7 μm.

In the cases of Comparative Examples 1 to 4, on the other hand, although Comparative Example 1 has the same thickness and the same melt viscosity of the image receiving layer 43 as in Example 1, the crack forming diameter is 100 mm, which is considerably poor, because the elongation after fracture of the polyester resin constituting the image receiving layer 43 is remarkably low as 5%.

In the case of Comparative Example 2, the elongation after fracture of the polyester resin constituting the image receiving layer 43 is considerably large as 150%, and further the melt viscosity of the image receiving layer 43 is 1,000 (Pa·s), which is relatively low. However, the burying property of an image is designated as the grade C, in which relief on the image are conspicuous, and gloss nonuniformity is formed. It is considered that this is because the thickness of the image receiving layer 43 is 5 μm, which is remarkably thin.

In the case of Comparative Example 3, the elongation after fracture of the polyester resin constituting the image receiving layer 43 is considerably large as 150%, and further the melt viscosity of the image receiving layer 43 is 1,000 (Pa·s), which is relatively low. However, the crack forming diameter is 50 mm, which exceeds the allowable value of 30 mm, It is considered that this is because the thickness of the image receiving layer 43 is 25 μm which is remarkably thick.

In the case of Comparative Example 4, the elongation after fracture of the polyester resin constituting the image receiving layer 43 is large as 50%, and further the thickness of the image receiving layer 43 is 12 μm, which is certainly thick. However, the burying property of an image is designated as the grade C, in which relief on the image are conspicuous, and gloss nonuniformity is formed, because the melt viscosity of the image receiving layer 43 is as high as 3,000 (Pa·s).

Figure 10:
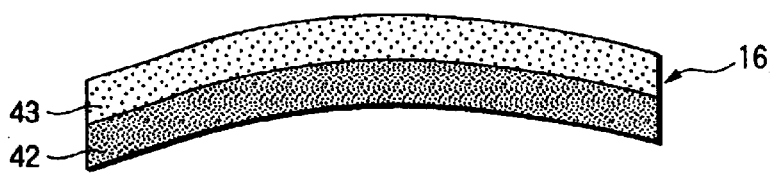
FIG. 10 is a schematic diagram showing the example of the invention.
Figure 11:
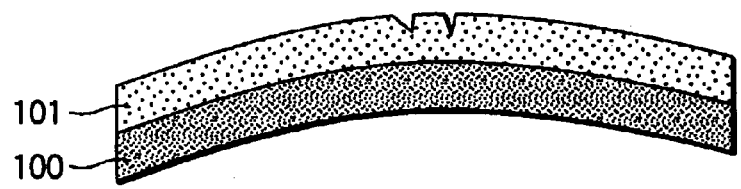
FIG. 11 is a schematic diagram showing the conventional example.
Figure 12:
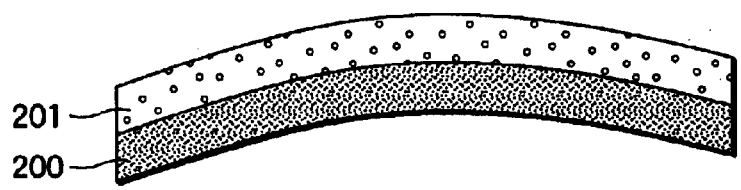
FIG. 12 is a schematic diagram showing the conventional example.
Figure 13:
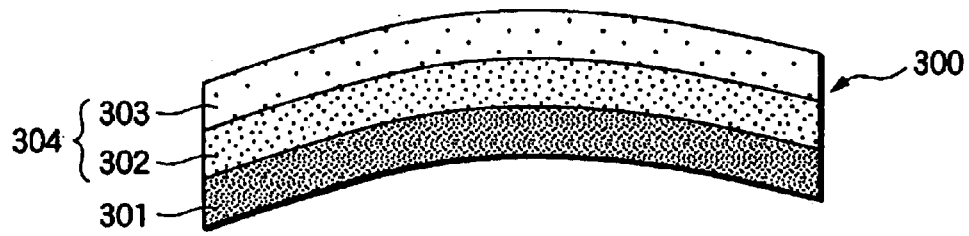
FIG. 13 is a schematic diagram showing the conventional example.

The following can be understood from the foregoing results. In the case where in the electrophotographic transfer sheet 16, as shown in FIG. 10, the melt viscosity at 120° C. of the resin constituting the image receiving layer 43 is from 200 to 2,000 Pa·s, and the elongation after fracture of the resin constituting the image receiving layer 43 is 50% or more, the toner image can be buried in the image receiving layer 43 formed with the thermoplastic resin to prevent the formation of relief on the toner image formed on the surface of the electrophotographic transfer sheet 16, whereby sufficient gloss can be obtained, and at the same time, formation of cracks on the surface of the electrophotographic transfer sheet 16 can be prevented. Furthermore, cracks formed due to the difference in thermal contraction caused by the conventional two-layer structure do not occur in the electrophotographic transfer sheet 16 because the image receiving layer 43 has the one-layer structure.

In the electrophotographic transfer sheet 16, when the thickness of the image receiving layer 43 is set in the range of from 7 to 20 μm, the formation of relief of a toner image on the surface of the electrophotographic transfer sheet 16 is prevented to obtain sufficient gloss, and the formation of cracks on the surface of the electrophotographic transfer sheet 16 can be prevented in a further certain manner.

In the electrophotographic transfer sheet 16, the melt viscosity at 120° C. of the resin constituting the image receiving layer 43 is from 200 to 2,000 Pa·s, and the elongation after fracture of the resin constituting the image receiving layer 43 is 50% or more. Such a constitution can be attained by, for example, appropriately mixing a polyester resin having a high elongation to the resin constituting the image receiving layer 43.

Examples of the polyester resin having a high elongation include one having a glass transition temperature Tg of about 30° C. or less, preferably 15° C., a melting temperature Tm of 110° C., a weight average molecular weight Mw of 15,400, a number average molecular weight Mn of 6,600, an elongation after fracture of 500% and a melt viscosity η (120° C.) of 300 (for example, Polyester Resin GK130, a trade name, produced by Toyobo Co., Ltd.).

Examples of the resin exhibiting good burying property of the toner but poor in formation of cracks include a polyester resin having a glass transition temperature Tg of 60.7° C., a melting temperature Tm of 92.7° C., a weight average molecular weight Mw of 13,300, a number average molecular weight Mn of 4,000, an elongation after fracture of 5% and a melt viscosity η (120° C.) of 200 (for example, Polyester Resin NE382-1, a trade name, produced by Kao Corp.), As the polyester resin constituting the image receiving layer 43, for example, a mixture obtained by mixing 50 parts of the polyester resin, NE382-1 produced by Kao Corp. and 50 parts of the polyester resin, GK130 produced by Toyobo Co., Ltd. is used.

Figure 9:
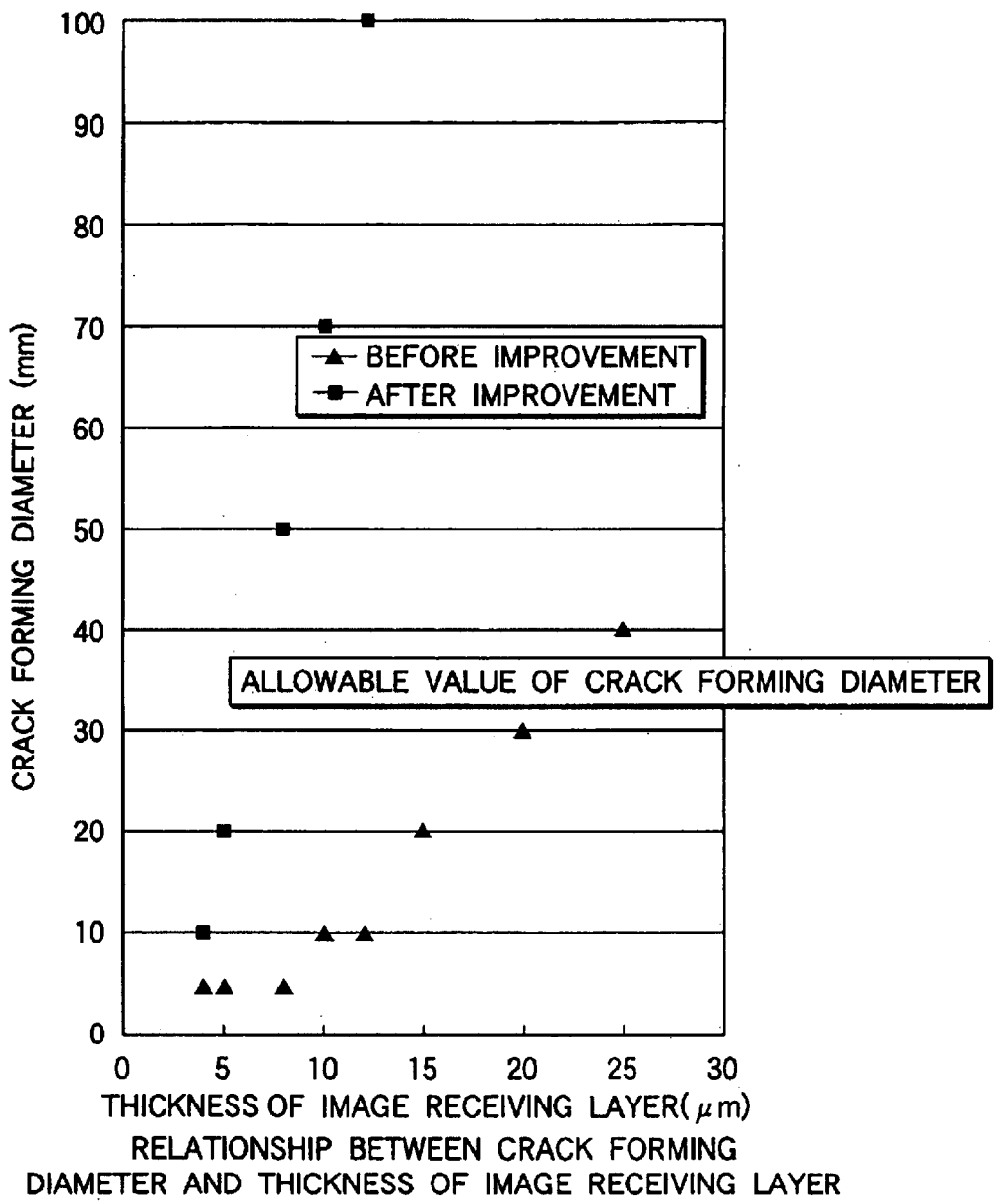
FIG. 9 is a graph showing the relationship between the crack forming diameter and the thickness of the image receiving layer.

FIG. 9 is a graph showing the relationship between the crack forming diameter and the thickness of the image receiving layer.

In the embodiment described in the foregoing, the electrophotographic transfer sheet 16 using a photographic paper base as the substrate 42 is described, but it is not limited thereto, and coated paper used for printing paper can also be used as the substrate 42.

According to the invention, as described in the foregoing, an electrophotographic transfer sheet and a process for forming a color image using the same can be provided, by which formation of relief of a toner image on the surface of the electrophotographic transfer sheet can be prevented, sufficient high gloss and gloss uniformity can be obtained, and formation of cracks on the surface of the electrophotographic transfer sheet can be prevented.

The entire disclosure of Japanese Patent Application No. 2000-285751 filed on Sep. 20, 2000 including specification, claims, drawings and abstract is incorporated herein by reference in its entirety.

What is claimed is:

1. An electrophotographic transfer sheet comprising a substrate having on at least one surface thereof an image receiving layer containing a thermoplastic resin, the thermoplastic resin constituting the image receiving layer having a melt viscosity of about from 200 to 2,000 Pa·s at 120° C. and an elongation after fracture of about 50% or more.

2. The electrophotographic transfer sheet as claimed in claim 1, wherein the thermoplastic resin has a glass transition temperature Tg of about 30° C. or less.

3. The electrophotographic transfer sheet as claimed in claim 1, further comprising coating layers comprising a resin formed on both surfaces of the substrate, wherein the image receiving layer is formed on at least one of the coating layers.

4. The electrophotographic transfer sheet as claimed in claim 1, wherein the image receiving layer is formed on one surface of the substrate, and a back layer is formed on the other surface of the substrate.

5. The electrophotographic transfer sheet as claimed in claim 3, wherein a back layer is formed on the other of the coating layers.

6. The electrophotographic transfer sheet as claimed in claim 4, wherein the back layer comprises a polyester resin of aqueous dispersion system.

7. The electrophotographic transfer sheet as claimed in claim 1, wherein the image receiving layer has a thickness of about from 7 to 20 μm.

8. A process for forming a color image, comprising the steps of: transferring a toner image comprising a color toner on an image receiving layer of the electrophotographic transfer sheet as claimed in claim 1; and fixing the toner image comprising a color toner transferred to the image receiving layer of the electrophotographic transfer sheet upon heat melting by a fixing unit to form a color image, the fixing unit containing a fixing belt supported as being capable of circulating by plural rolls containing a heating roll, a pressure roll being in contact under pressure with the heating roll through the fixing belt to form a pressure contact part between the fixing belt and the pressure roll, the electrophotographic transfer sheet being passed through the contact part under pressure to make the toner image face the fixing belt, so as to fix the toner image, and the electrophotographic transfer sheet being released from the fixing belt under a condition where the fixing belt is cooled.

* * * * *